(12) United States Patent
Bingeman et al.

(10) Patent No.: US 8,039,046 B2
(45) Date of Patent: Oct. 18, 2011

(54) FRICTION REDUCTION COMPOSITION AND METHOD

(75) Inventors: Ronald E Bingeman, Brookhaven, PA (US); John M Chandler, Bear, DE (US)

(73) Assignee: Uniqema Americas LLC, Wilmington, DE (US)

( * ) Notice: Subject to any disclaimer, the term of this patent is extended or adjusted under 35 U.S.C. 154(b) by 1133 days.

(21) Appl. No.: 11/497,520

(22) Filed: Aug. 2, 2006

(65) Prior Publication Data

US 2008/0028977 A1    Feb. 7, 2008

(51) Int. Cl.
*B05D 1/02* (2006.01)
(52) U.S. Cl. .................... 427/133; 427/136; 427/138
(58) Field of Classification Search ............ 427/133, 427/136, 138
See application file for complete search history.

(56) References Cited

U.S. PATENT DOCUMENTS

| | | | | |
|---|---|---|---|---|
| 5,407,490 A | * | 4/1995 | Zofchak | 134/34 |
| 6,486,259 B1 | * | 11/2002 | Betts et al. | 525/192 |

FOREIGN PATENT DOCUMENTS

| | | | |
|---|---|---|---|
| WO | WO2004111168 | * | 12/2004 |
| WO | WO2005102265 | * | 11/2005 |

* cited by examiner

*Primary Examiner* — Timothy Meeks
*Assistant Examiner* — Nathan T Leong
(74) *Attorney, Agent, or Firm* — Jones Day

(57) ABSTRACT

The present invention relates to compositions which are suitable for use as friction reducing agents, which can be particularly useful as release agents. The compositions comprise water and a surfactant capable of forming liquid crystals. The invention also relates to methods of production of such compositions, their use and substrates treated with such compositions.

33 Claims, 1 Drawing Sheet

FRICTION REDUCTION COMPOSITION AND METHOD

FIELD OF THE INVENTION

The present invention relates to compositions which are suitable for use as friction reducing agents, which can be particularly useful as release agents. The compositions comprise water and a surfactant capable of forming liquid crystals. The invention also relates to methods of production of such compositions, their use and substrates treated with such compositions.

BACKGROUND OF THE INVENTION

Compositions to reduce friction are well known, including those suitable for use as release agents. Many friction reducing compositions are based on mineral oils which, although often effective, are now becoming generally undesirable due to environmental and health concerns.

Accordingly there is a need for environmentally friendly friction reducing compositions in many technical fields.

One area where a mineral oil, usually in the form of diesel, has been extensively used is in the manipulation and transport of asphalt. The majority of roads, car parks and the like are constructed using asphalt, which is a combination of aggregate and bituminous components. Asphalt is generally manufactured at a plant and then transported to an area of construction on a vehicle, often a "dump truck" or similar vehicle having a bed for holding the asphalt. It is then applied as required for the particular task, e.g. using road laying equipment. Asphalt is inherently adhesive and tends to stick to any surface it contacts, i.e. the bed of the transport truck, and tools or apparatus used in laying or maintaining the asphalt. Traditionally this has been combated by coating surfaces which are to be in contact with the asphalt with diesel which acts as a lubricant between the asphalt and the surface. One disadvantage of diesel in this role is that is can partially dissolve and "soften" the asphalt; this may be advantageous in allowing it to slide relatively easily from the surface, but it can degrade the quality of the resultant asphalt. Use of diesel in such a role has, however, become unacceptable for environmental and health reasons. Accordingly, there is a need for alternative compositions and methods for preventing undesirable adhesion of asphalt to surfaces. Such compositions should be environmentally friendly, effective and cheap enough to be economically viable.

U.S. Pat. No. 6,486,259 describes a combination of a polyvinyl alcohol, glycerol, polyethyleneglycol and a wetting agent or surfactant which are suitable for use as an asphalt release agent. U.S. Pat. No. 5,494,502 discloses an asphalt release agent which comprises a fatty oil as the active ingredient in combination with a surfactant or foaming agent.

Another area where release agents are required is for the release of objects from mould in which they were formed. For example, a particularly significant field is in the release of pre-formed concrete or other hydraulic bonding materials (e.g. cement or plaster) from moulds. This has been achieved in the past using mineral oil, often with additives such as retarding agents to prevent curing of the concrete at its surface, as well as wetting agents or corrosion inhibitors. Such agents can, in some instances, have disadvantages in that they may adversely affect the surface of the concrete. Other areas where mould release agents are required are, for example, rubber or plastics moulding, foundry moulding, and clay or terracotta moulding. As with asphalt release, the use of mineral oils in these areas is highly undesirable from an environmental and a health perspective. Accordingly, there is a requirement for non-toxic, environmentally friendly release agents in these fields.

U.S. Pat. No. 5,374,303 describes a release agent for hydraulic bonding materials which comprises an oil component, which is an ester of a hindered polyhydric alcohol and a straight or branched chain saturated or unsaturated $C_4$-$C_{24}$ monocarboxylic acid. A surfactant is used to create an aqueous emulsion of the oil component. U.S. Pat. No. 5,709,739 describes a release agent for hydraulic binders which comprises water, an oil component comprising a water-immiscible monohydric alcohol and an emulsifier. U.S. Pat. No. 5,474,604 describes a composition suitable for use as a release agent in, e.g. the building, rubber and plastics processing industries. The composition comprises fatty alcohols having 16 to 24 carbon atoms, wax esters and fatty ketones. U.S. Pat. No. 5,100,697 describes a release agent which comprises an oil and water emulsion comprising an oil component bath and an ionic and a non-ionic surfactant.

In the general field of release agents, in particular the more specific fields of asphalt release agents and mould release agent, there is a general consensus that release agents used to replace mineral oils are usually both more expensive and less effective than their mineral oil counterparts. Accordingly, there is a need for improved friction reducing compounds which are both effective and economical.

Improved friction reducing compositions, particularly release agents, may have utility in other fields of industry, for example, in metal deformation, forging or machining.

Liquid crystals are well known in certain areas of technology, particularly thermotropic liquid crystals which are noted for their use in display technology. However, there is another form of liquid crystals known as lyotropic liquid crystals which are less well known. Lyotropic crystals are formed from amphiphilic compounds (e.g. surfactants) which are characterised by consisting of molecules in which one end of the molecule is polar and the other end is non-polar. When dispersed in water, certain amphiphilic compounds take on a liquid crystal structure at particular concentrations. As the concentration of such surfactants increases the liquid crystal can, in many instances, change from a cubic liquid crystal to a hexagonal form and then a layered or lamellar phase—this is described in more detail below. Lyotropic liquid crystals, in general, rarely exist in solutions that are less that half amphiphile by weight and lamellar liquid crystals typically form at even higher concentrations.

Lamellar liquid crystals are known for use in the cosmetic industry, however, use outside this field is not generally recognised. WO 2005/102265 discloses a surfactant composition capable of forming liquid crystals in water which comprises at least one sorbitan ester and at least one sorbitol ester, wherein the mean number of carbon atoms in the hydrophobe of the sorbitan ester is greater than that of the sortitol ester. WO 2004/111168 discloses surfactant compositions comprising at least one branched non-ionic surfactant and at least one surfactant capable of forming liquid crystals in water. In both the two aforementioned patent applications the compositions disclosed are for use as cosmetic compositions.

SUMMARY OF THE INVENTION

The present invention provides methods of reducing friction involving compositions which have been surprisingly found to be particularly effective friction reducing agents. The invention also provides specific compositions with excellent properties for use in such methods, methods of manufacture of these compositions and substrates treated with such compositions.

The compositions have been found to be particularly useful as release agents, though also have utility outside of this field. Release agents may, in most instances, be considered to involve the reduction of static friction, i.e. reducing the friction which prevents two surfaces which in contact from beginning move relative to one another, rather than dynamic friction, i.e. reducing the friction of two surfaces which are already moving relative to one another.

According to a first aspect of the present invention there is provided a method of reducing friction on a surface, the method comprising:

applying to said surface a composition comprising water and at least one surfactant in the form of liquid crystals.

Such compositions appear to perform particularly well in some situations because they dry to leave a waxy layer which retains excellent lubricity. Thus the method of the present invention may optionally include the step of allowing said composition to dry to form a film.

In other situations the composition may be used in a wet form, i.e. where the composition has not dried to leave a film. The composition in this form also has excellent lubricating properties.

The compositions of the present invention, as mentioned above, are particularly suitable for use as a release agent to facilitate release of a substance from a surface. Accordingly in a preferred embodiment the present invention relates to a method of facilitating release of a substance from said surface.

In a preferred embodiment of the method of the present invention the composition may be used to prevent or reduce adhesion (i.e. facilitate release) of a material to surfaces involved in transporting, storing, handling and/or manipulation of a substance. This is envisaged as being of particular use in the field of asphalt manufacture, processing and handling, and accordingly suitable surfaces are those involved in such activities. The composition of the present invention is particularly useful for preventing or reducing adhesion of asphalt to a surface of, for example, the bed of a transport truck, the bucket of a digger, tools (such as shovels, blades or other tools), and asphalt handling plant equipment (such as road layers and road rollers).

The method of the present invention may also be used to facilitate release of an object which has been formed in a mould. Accordingly the method may involve applying said composition to the surface of a mould. Such objects include, for example, pre-moulded concrete structures (e.g. slabs, block or more complex reinforced structures), tiles and other clay objects, plastics and rubber mouldings, and forged or pressed metal objects. As mentioned in more detail below, particularly desirable properties of release agents for moulds are that they facilitate easy removal, but also that they do not cause damage or alteration to the surface of the moulded object. The compositions of the present invention are advantageous in that they are highly effective at reducing friction to allow release of the moulded object, but also in that they are not chemically aggressive, and accordingly do not generally negatively affect the surface of moulded objects.

The method of the present invention may, of course, be used to facilitate release of, in principal, any material which tends to adhere undesirably to a surface. It is important, in general, that the composition does not react in an undesirable way with the surface or the material being used. However, the composition of the present invention is fairly chemically inert and is not envisaged to be a problem in most instances. It would of course be routine for the person skilled in the art to determine if any deleterious interaction would occur.

One particular area where the composition of the present invention is expected to have utility as a friction reducing agent (rather than a release agent) is in vehicle tracks, particularly rail road tracks or tram tracks. On curved sections of such tracks significant energy is lost due to friction. The composition of the present invention may be applied to such sections to improve efficiency. The environmental and lubricating layer forming properties of the compositions make them particularly suitable for such a purpose.

The composition of the present invention may be applied by spraying, brushing, sponging or dipping or other such conventional means of application to a surface. Spraying is envisaged to be a preferred method as it achieves even coverage and is fast and suitable for automation.

Suitably, the composition is applied at a rate suitable to obtain a coverage of the surfactant of 50 to 500 $g/m^2$, preferably 100 to 400 $g/m^2$, particularly 150 $g/m^2$ to 350 $g/m^2$.

As the composition typically includes less than 20% surfactant, the balance generally being water, the application rate for the composition will typically be 5 or more times (depending, of course, on the concentration of surfactant) the above-mentioned application rates to obtain the desired level of surfactant.

Such rates of applications have been found to give good coverage without being inefficient or providing excess composition on the surface to be treated.

It is generally preferred that the surfactant is substantially in the form of lamellar liquid crystals, though other forms of liquid crystals may be suitable. Lamellar liquid crystals exhibit low viscosity (particularly when shear force is applied) and lubricity properties, presumably as the layers are able to flow over one another. This results in particular advantageous properties of the composition.

Liquid crystals of surfactant in water are known as lyotropic liquid crystals, and their properties are dependant on concentration and, to a lesser extent, temperature. As the concentration of surfactant increases, the structure of the dissolved or dispersed surfactant changes, typically through a set series of structures or phases. It should, however, be understood that these changes of phase form a continuum, and that different phases may co-exist in a dynamic equilibrium at a particular concentration. At relatively low concentrations the surfactant forms round micelles which are distributed more or less at random. Micelles are more or less spherical structures in which, typically, the hydrophilic (polar) heads of surfactant form the outer surface, with the hydrophobic (non-polar) tails projecting into the centre of the sphere. As the concentration increases these micelles tend to arrange into cubic arrays (cubic liquid crystals). At higher concentrations the micelles form rod shaped structures which pack into hexagonal arrays comprising 7 rods lying parallel, with 6 rods grouped around a central rod (hexagonal crystals). At even higher concentrations the surfactant molecules form a bilayer structure (lamellar liquid crystals). The bilayer is formed of a double layer of surfactant, somewhat reminiscent of a sandwich, with polar heads on the surface (the bread), and the hydrophobic tails in the centre (the filling). For more information see http://plc.cwru.edu/tutorial/enhanced/files/llc/Intro/Intro.htm.

As mentioned above, the lamellar phase of the surfactant is of particular interest in the present invention. However, at a given concentration the surfactant will often be partly in lamellar phase and partly in other phases. Accordingly, a composition may be considered to contain surfactant which is substantially in the lamellar phase when it contains surfactant which is 50% or more in the lamellar phase, preferably 75% or more, particularly 90% or more.

The particular liquid crystal structures formed by the surfactants appear to increase the friction-reducing properties of the composition in excess of that which could be achieved using a conventional emulsion of surfactant and an oily compound or using a surfactant which does not form liquid crystals.

The at least one surfactant used in the present invention is preferably a non-ionic surfactant. Ionic surfactants do not tend to form liquid crystals as required in the present invention.

Suitable surfactants for use in the present invention typically have an hydrophile/lypophile balance (HLB) of from about 1 to about 10. Surfactants with an HLB in this range are generally suitable for forming liquid crystal structures in water with the desired structure. In general, surfactants with an HLB of from about 2 to about 7 are preferred. Surfactants with an HLB of from about 4 to about 6 are typically well suited for the formation of desirable liquid crystals.

Suitably the at least one surfactant used in the present invention has a melting point of 30° C. or above. It is generally advantageous that the melting point is above the ambient temperature where the composition is to be used. This may have the effect that the surfactant does not tend to melt from its crystalline form. This is perhaps more significant when the composition is dried following application to form a layer on the substrate.

Particularly suitable surfactants which can be used in the present invention include sorbitan-based surfactants. The term "sorbitan-based" relates to surfactants which contain at least one sorbitan moiety, which provides a polar activity to the surfactant, and at least one moiety which provides a hydrophobic activity to the surfactant. Suitable sorbitan-based surfactants include sorbitan esters, for example, sorbitan cocoate, sorbitan caprate, sorbitan laurate, sorbitan myristate, sorbitan palmitat and/or sorbitan stearate. Preferred sorbitan esters include sorbitan stearates, in particular sorbitan monostearate.

Sorbitan-based surfactants are particularly suitable due to their low price, propensity to form suitable liquid crystal structures and environmental and health compatibility.

The at least one surfactant used in the present invention may additionally or alternatively comprise an alkoxylate surfactant.

The term alkoxylate surfactant is used to refer to surfactants in which a hydrophobe, usually a hydrocarbyl group, is connected through the residue of a linking group having a reactive hydrogen atom to an oligomeric or polymeric chain of alkylene oxide residues. The hydrocarbyl group is typically a chain, commonly an alkyl chain, containing from 8 to 24, particularly 12 to 22, and usually 14 to 20 carbon atoms. The linking group can be an oxygen atom (hydroxyl group residue); a carboxyl group (fatty acid or ester residue); an amino group (amine group residue); or a carboxyamido (carboxylic amide residue). The alkylene oxide residues are typically residues of ethylene oxide ($C_2H_4O$) or propylene oxide ($C_3H_6O$) or combinations of ethylene and propylene oxide residues. When combinations are used the proportion of ethylene oxide residues will usually be at least about 50 mole % and more usually at least 75 mole %, the remainder, if any, being propylene oxide residues. Particularly and desirably, substantially all the residues are ethylene oxide residues. The number of alkylene residues in the emulsifier molecule is desirably from 2 to about 20, provided that the resulting molecule has a desirable HLB as defined above. At least theoretically, alkyl phenyl ethoxylates could be used, but these are generally not now desired due to potential health concerns.

The number of alkylene oxide residues is usually from 2 to about 20 per mole of alkoxylate emulsifiers and will vary depending on the balance between hydrophilic and hydrophobic properties desired in the emulsifier. Examples of suitable alkoxylate emulsifiers include alcohol alkoxylates, of the formula (Ia): $R^1$—O-(AO)$_n$—H; a fatty acid alkoxylate of the formula (Ib): $R^1$—COO-(AO)$_n$—$R^2$ (plus co-products); a fatty amine alkoxylate of the formula (Ic): $R^1$—$NR^3$—(AO)$_n$—H; or a fatty amide alkoxylate of the formula (Id); $R^1$—$NR^3$-(AO)$_n$—H, where each $R^1$ is independently a $C_8$ to $C_{24}$, particularly $C_{12}$ to $C_{22}$, hydrocarbyl, particularly alkyl group; $R^2$ is a hydrogen atom or a $C_1$ to $C_6$ alkyl group; and each R3 is independently a $C_1$ to $C_6$ alkyl group or a group (AO)$_n$—H; each AO is independently an ethylene oxide or propylene oxide group; and the total of the indices n in the molecule is from 2 to about 20.

Particularly suitable solid alkoxylate surfactants include polyoxyethylene-based surfactants such as polyoxyethylene stearyl ether and polyoxyethylene cetyl ether surfactants. Polyoxyethylene (2) stearyl ether and polyoxyethylene (2) cetyl ether are preferred surfactants. Polyoxyethylene (2) stearyl ether is a particularly preferred surfactant.

It should be noted that the present invention may comprise a mixture of more than one surfactant. It is, of course, important that the mixture of surfactants is capable of forming liquid crystals as required by the present invention. Suitable mixtures of surfactants include a mixture of two or more sorbitan-based surfactants, two or more alkoxylate surfactants or a combination of a sorbitan-based surfactant and an alkoxylate surfactant. For example, preferred compositions according to the present invention may comprise:

Sorbitan monostearate and polyoxyethylene (2) stearyl ether.

Sorbitan tristearate and sorbitan monostearate.

Sorbitan tristearate and polyoxyethylene (2) stearyl ether.

It is generally advantageous that the compositions used in the present inventions are shear thinning. Shear thinning relates to the property of certain fluids where they reduce in viscosity when shear force is applied. This property is often referred to as "thixotropy". However, this term is more properly used in relation to a decrease in viscosity with time of shearing rather than rate of shearing. In general, however, the two terms are often used interchangeably and the compositions of the present invention may also be thixotropic.

Shear thinning properties are particularly advantageous as they allow compositions of the present invention to be sprayed or processed as fluids of relatively low viscosity, however, they then revert to a highly viscose nature when shear forces are removed. This is particularly useful where the compositions of the present invention are applied by spraying.

It is particularly advantageous that the composition for use in the present invention exhibits power law shear thinning behaviour at 25° C. at shear rates of 1 to 1000 s$^{-1}$.

It is preferable that the structure of the composition rebuilds rapidly once the shear force is removed. This allows the composition to regain its viscosity once the composition has been applied, e.g., via spraying. The rapid rebuild time means the composition forms a viscous layer which is less likely to run or form uneven thickness than if it retained a low viscosity for a protracted period. Advantageously the composition of the present invention regains 90% of its viscosity within 1000 ms of removal of shear force, preferably within 500 ms, especially within 250 ms.

As mentioned above, it is desirable that the composition for use in the present invention has a relatively high viscosity when not subjected to shear force. Such a high viscosity is desirable in achieving a suitable coverage of the composition on a surface to be treated. Particularly suitable viscosities are in the range of from about 2000 to about 10,000 centipoise (cP), preferably from about 3000 to about 9000 cP, especially from about 4000 to about 8000 cP. It will be clear that the viscosity values given above are for the composition when negligible shear force is applied, as shear force would reduce the viscosity in a shear thinning fluid.

According to a further aspect the present invention provides a friction reducing composition comprising a dispersion of liquid crystals of surfactant in water, said composition comprising:
from 80% to 99% water; and
from 1% to 20% of at least one surfactant capable of forming liquid crystals in water;
wherein the composition is shear thinning.

Preferred surfactants are set out above.

Unless otherwise stated, percentage of compounds of the compositions are given as percentage by weight (i.e. w/w).

As discussed above such a composition has desirable friction reducing properties and in particular is suitable for use as a release agent. Due to its shear thinning properties it is particularly suitable for use in spraying and has a tendency to form a layer which is desirable in applications where the composition is used as a release agent.

In a preferred embodiment the composition comprises from 87% to 99% water and from 1% to 13% of said surfactant (N.B. all components amounts are given by weight, i.e. w/w). Compositions with up to 13% surfactant tend to be relatively fluid (i.e. have a reasonably low viscosity which allows them to flow as a liquid) which is advantageous in many handling situations. Compositions which contain more than 13% surfactant tend to be paste like in consistency and thus are less suitable for spraying, but may still be applied by brushing and other such application techniques. There may of course be some uses where a paste like composition is preferred.

Preferred compositions comprise from about 90% to about 98% water and from about 2% to about 10% surfactant. Compositions which comprise from 1% to 5% of a sorbitan-based surfactant and from 1% to 5% of an alkoxylate surfactant, with the balance being water have been found to be particularly effective.

Specific embodiments of compositions of the present invention comprise (N.B. all components amounts are given by weight, i.e. w/w):
93% Water
7% Span 60™ (ex Uniqema, sorbitan monostearate)
or
93% Water
3.5% Span™ 60 (ex Uniqema, sorbitan monostearate)
3.5% Brij™ 72 (ex Uniqema, polyoxyethylene (2) stearyl ether)
or
92.9% Water
3.5% Span™ 60 (ex Uniqema, sorbitan monostearate)
3.5% Brij™ 72 (ex Uniqema, polyoxyethylene (2) stearyl ether)
0.1% Brij™ 700 (ex Uniqema, polyoxyethylene (100) stearyl ether)

It is a particular advantage of the present composition is that it performs extremely well as a friction reducing agent in the absence of any oil component in emulsion with the surfactant. Prior art compositions typically use surfactants in a emulsifying role where they serve to stabilise a suspension of an oil, lubricating compound in water. The present compositions provide advantages in that an additional lubricating component is not required, thus simplifying the composition and making it more economical to produce.

Accordingly, in one embodiment, the composition of the present invention does not contain significant quantities of an oil component. For example, there may suitably be 5% or less of an oil component, optionally 3% or less, particularly 1% or less, especially a trace amount or less. By the term "oil component" is meant a hydrophobic compound which is essentially non-soluble in water in the absence of a surfactant, e.g. mineral oil or vegetable oil.

However, in some embodiments of the present invention it may be desirable to include one or more additive components. Suitable additive components include, for example, hydrophobic compounds such as oils (e.g. vegetable or mineral oils), or hydrophilic compounds such as alcohols or sorbitol. Such additives may be used to modify the properties of the composition.

For example, hydrophobic compounds (such as oil components) may be added in order to increase the hydrophobic content of the composition which may be more suitable for use as a release agent for asphalt or other hydrophobic materials.

Alternatively, the addition of alcohols or other compositions which reduce the freezing point of the composition may be useful if it is to be used in cold climates or other cold environments.

Other additives which may be useful include corrosion inhibitors (e.g. the borate ester known as Monacor BE).

It should be noted that the addition of substantial quantities high HLB surfactants (e.g. those with an HLB above 10) are generally incompatible with the liquid crystal structure desired in the present composition. However, where a small proportion of high HLB surfactant is introduced to the composition it has been surprisingly found to modify the liquid crystal structure in a desirable manner.

Accordingly, the composition of the present invention may suitably include up to 0.5% surfactant with an HLB greater than 10. Generally, when it is included, the high HLB surfactant will be present in quantities of 0.3% or less, preferably 0.1% or less. Suitably the high HLB surfactant has an HLB of from 10 to 20, preferably from 15 to 20. A particularly suitable surfactant for use as a high HLB surfactant is polyoxyethylene (100) stearyl ether. Addition of a high HLB surfactant as mentioned above can have the effect of converting the lamellar liquid crystal structure into balloon-like structures which are particularly suitable for encapsulating hydrophobic substances. These balloon-like structures are multi-lamellar structures which may, in some instances, form a lamellar gel network.

The present invention also relates, in a further aspect, to a diluted form of the compositions described above. Depending on the particular use for the composition it may be satisfactory to use it in a diluted form. Typically dilutions of from 2 to 10 times may be used. The dilution is typically in water but it may, in some situations, be appropriate to dilute the composition in an alternative polar solvent, such as an alcohol.

According to a further aspect, the present invention also provides a method of production of a friction reducing composition, said method comprising the steps of:
providing 80 to 99% by weight water;
providing 1 to 20% by weight of at least one surfactant capable of forming liquid crystals in water;
mixing the at least one surfactant and water under conditions to allow formation of liquid crystals.

It is generally preferred that the water is heated prior to mixing with the surfactant as this improves the mixing process. Typically the water is heated to a temperature above the melting point of the surfactant or, if more than one surfactant is present, then to above the melting point of the surfactant with the highest melting point.

It is generally preferred that the mixing is conducted by agitating the mixture in a manner to minimise aeration. This may be achieved, for example, by using baffles.

In a preferred embodiment of the method of making the composition the rate of agitation of the mixture is increased after the at least one surfactant has completely melted or dissolved. The period for which the agitation is increased will depend on the size of the batch and the particular characteristics of the surfactant being used. The increase in rate of agitation has been found to improve formation of the lamellar phase of liquid crystals.

According to further aspect, the present invention relates to a friction reduction layer formed by application of the composition as described above. In one embodiment the layer is formed by applying the composition followed by a period of drying sufficient to allow the majority of the water to leave the composition. Such a friction reducing layer may advantageously be employed where it is desired to produce a dry layer, rather than a liquid lubricating layer. Such a layer is advantageously achieved where the composition is applied at a rate suitable to obtain a coverage of the surfactant of 50 to 500 g/m$^2$, preferably 100 to 400 g/m$^2$, particularly 150 g/m$^2$ to 350 g/m$^2$.

According to a further aspect the present invention provides a substrate having at least a portion of its surface coated with a composition comprising water and at least one surfactant in the form of liquid crystals.

In one embodiment the substrate may, for example, be an object used in the transport, storing, handling or manipulation of material, particularly asphalt. Particularly envisaged substrates include vehicles, tools or plant equipment used in the asphalt industry.

In another embodiment the substrate may be a mould. Particularly envisaged moulds are for use in the production of objects made from concrete or other hydraulic bonding materials, clay or terracofta, plastics or rubber mouldings and forged or pressed metal objects.

In a further embodiment the substrate may be a vehicle track, particularly a railroad track or tram track.

Embodiments of the invention will now be described, by way of example only, which are non-limiting to the scope of the invention.

DETAILED DESCRIPTION OF THE INVENTION

Example 1

Process for Production

A composition according to the present invention is made as follows.

The composition comprises (N.B. all components amounts are given by weight, i.e. w/w):
93% water
3.5% Span™ 60 (ex Uniqema, sorbitan monostearate)
3.5% Brij™ 72 (ex Uniqema, polyoxyethylene (2) stearyl ether)

The tap water is heated to a temperature of 53° C.—i.e. just above the melting point of Span™ 60.

Moderate agitation is applied to the water using baffles to avoid aeration.

The Span™ 60 and Brij™ 72 are added to the water. Once the surfactants are completely melted the rate of agitation is increased for 5 to 10 minutes.

The batch is then allowed to cool. Agitation is reduced to the moderate rate and continued during the cooling phase.

Drumming of the composition may be conducted while the composition is around 40° C. to 50° C., while the viscosity is still moderately low.

Example 2

Process for Production

Another composition according to the present invention is made as follows.

The composition comprises:
92.9% water
3.5% Span™ 60 (ex Uniqema, sorbitan monostearate)
3.5% Brij™ 72 (ex Uniqema, polyoxyethylene (2) stearyl ether)
0.1% Brij 700 (ex Uniqema, polyoxyethylene (100) stearyl ether)

The water is heated to 80° C. Moderate agitation is applied to the water using baffles to avoid aeration.

The remaining procedure is essentially identical to Example 1.

The methods of manufacture of compositions described in examples 1 and 2 are suitable for small scale production, e.g. in a laboratory. It would, however, be routine to the person skilled in the art to scale the procedure up for large scale production.

Example 3

Rheological Testing

A sample of the composition was tested for its rheological properties. The sample contained the following components:
92.6% water
3.5% Span™ 60 (ex Uniqema, sorbitan monostearate)
3.5% Brij™ 72 (ex Uniqema, polyoxyethylene (2) stearyl ether)
0.1% Brij 700 (ex Uniqema, polyoxyethylene (100) stearyl ether)
0.3% Monacor BE (This is an amine-borate ester that provides ferric corrosion inhibition)

Figure 1:
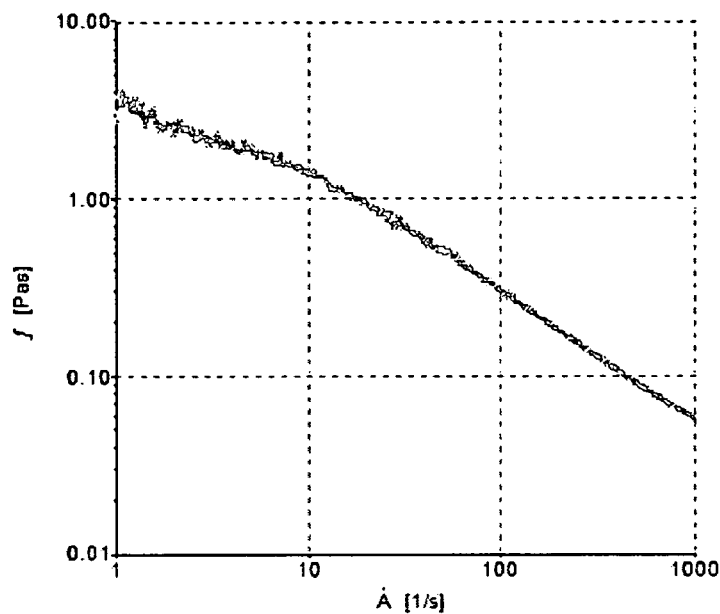
FIG. 1 is a graph showing power law shear thinning behaviour of a composition of the present invention.
Figure 2:
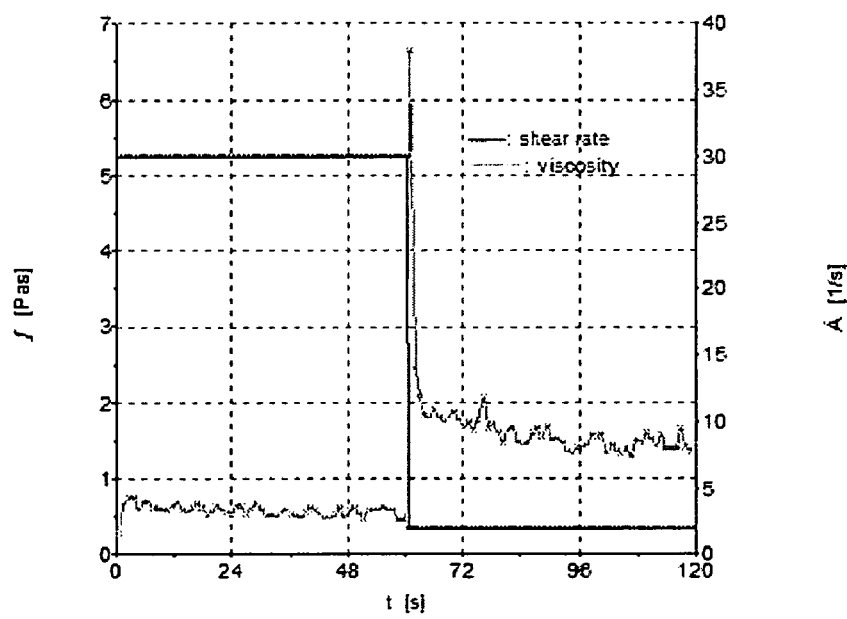
FIG. 2 is a graph showing the rebuild of structure of a composition of the present invention.

From shear rates of 1 to 1000 s$^{-1}$ the sample shows power law shear thinning behaviour at 25° C. (see FIG. 1). The structure of the sample also rebuilds rapidly to a viscous form (see FIG. 2). First the sample is pre-sheared at a shear rate of 30 s$^{-1}$ for 60 seconds, breaking a law shear rate (25-1) to monitor for rebuild of the viscosity; the viscosity is seen to rebuild faster than can be measured by the instrumentation.

Example 4

Use of the Composition in Concrete Release

Laboratory evaluations were performed to demonstrate the efficacy of a composition according to the present invention as a concrete release agent.

The composition used was as in Example 2.

This work evaluated release of concrete from both steel and wood substrates. In each case an effective release was realized using the following conditions as compared to the use of diesel fuel as a release agent/lubricant.

The test process was as follows:

300 grams of freshly-prepared aggregate concrete was placed on top of an surface treated with the test composition.

A 5 Kg weight was placed on top of the wet concrete.

After 24 hours the weight was removed and the substrate was tilted at a 45 degree angle.

The results were as follows:

A "shift" of the concrete from the treated substrate (steel and wood) was observed in each of the listed conditions:

Diesel fuel (43.2 g/foot$^2$ (471 g/m$^2$))

Test composition (360 g/foot$^2$ (3925 g/m$^2$); at approx 7% surfactant content=25.2 g/foot$^2$ (274.75 g/m$^2$) surfactant) following a two hour drying time.

Test composition (360 g/foot$^2$ (3925 g/m$^2$); at approx 7% surfactant content=25.2 g/foot$^2$ (274.75 g/m$^2$) surfactant) without any drying time.

Test composition diluted 2:1 with water (approx 8.64 g/foot$^2$ (94.2 g/m$^2$) surfactant) following a two hour drying time.

Test composition diluted 2:1 with water (approx 8.64 g/foot$^2$ (94.2 g/m$^2$) surfactant) without drying time.

Wet concrete applied to untreated wood and steel adhered noticeably, though with time and mild agitation it was found to release.

The conditions in this laboratory setting were useful and revealing, but not fully representative of real world situations. It is to be expected that in the real world the use of vibration and additional pressure, due to the weight of concrete or the moulding process, would cause far greater bonding of the concrete to the surfaces it contacts. In such conditions the efficacy of the composition of the present invention would be expected to be accentuated and the results be more emphatic.

A major difference observed in these investigations was the amount of residue remaining on the substrate—this is an important consideration, particularly in the moulding applications. The lowest amount of residue that was qualitatively observed to remain on the substrate was effected by the 2:1 dilution of the test composition, followed by the neat test composition (dry or wet), followed by diesel fuel, then the untreated surfaces.

Conclusions:

The compositions of the present invention are effective release agents.

The level of residue remaining on the substrate indicates that compositions according to the present invention are in fact highly effective, and offer significant improvements over diesel.

The composition is effective even in a dilute form.

A suitable amount of material for these tests appeared to be between 8.64 g/foot$^2$ (94.2 g/m$^2$) and 360 g/foot$^2$ (3925 g/m$^2$) expressed as surfactant content. Based on field evaluations, it is expected that optimum application concentrations would vary with the mass of the material, e.g. concrete, that is cast. It may be expected that a suitable maximum amount of test composition for most applications would be 360 g/foot$^2$ (3925 g/m$^2$) surfactant, though it would obviously be desirable to use the minimum amount of surfactant to reduce costs.

Example 5

Coating Properties

The 2:1 water dilution of the test composition as mentioned above was hand-sprayed onto a clean, vertical glass surface. No runoff or movement of the residue was observed.

This clearly illustrates the rapid reforming property observed in the abovementioned studies into the composition's rheological properties. Additionally, the residue/film that formed was not smooth but assumed the coarse spray pattern, further demonstrating the rapid setting properties. Of course a finer, more even coating could be achieved using finer spray technology which is known in the art.

Example 6

Additional Results

In further trials, compositions according to the present invention were found to perform extremely well in the release of asphalt from truck beds and moulded concrete structures from their moulds. A further aspect of note was the lack of a build up of residue on the treated substrates, which is particularly significant in mould release applications. This further demonstrates the efficacy of the compositions of the present invention in as release agents.

The invention claimed is:

1. A method of reducing friction on a surface, comprising:
    a) applying to at least a portion of said surface a composition comprising water and at least one surfactant in the form of liquid crystals to treat the surface; and
    b) introducing a material to the treated surface;
wherein:
    i) the at least one surfactant comprises a sorbitan ester selected from the group consisting of sorbitan cocoate, sorbitan caprate, sorbitan laurate, sorbitan myristate, sorbitan palmitate and sorbitan stearate; and
    ii) the material comprises asphalt or the surface is a mold.

2. The method of claim 1 wherein the composition is used as a release agent to facilitate release.

3. The method of claim 1 which comprises the step of allowing said composition to dry to form a film.

4. The method of claim 1 in which the composition is applied to an asphalt contacting surface which is selected from the group consisting of a bed of a transport truck, a bucket of a digger, a tool, a mould, a vehicle track, and asphalt handling plant equipment.

5. The method of claim 1 in which the composition is applied to the moulding surface of a mould.

6. The method of claim 1 in which the composition is applied to the moulding surface of a mould for the production of an object selected from the group consisting of pre-moulded concrete structures, clay objects, plastics, mouldings, rubber mouldings, and forged or pressed metal objects.

7. The method of claim 1 wherein the composition is applied by spraying.

8. The method of claim 1 wherein the composition is applied to said surface at a rate suitable to obtain a coverage with the surfactant of 50 to 500 g/m$^2$.

9. The method of claim 1 wherein the composition is applied to said surface at a rate suitable to obtain a coverage with the surfactant of 100 to 400 g/m$^2$.

10. The method of claim 1 wherein the composition is applied to said surface at a rate suitable to obtain a coverage with the surfactant of 150 to 350 g/m$^2$.

11. The method of claim 1 wherein the surfactant is substantially in the form of lamellar liquid crystals.

12. The method of claim 1 wherein the surfactant is 50% or more in the form of lamellar liquid crystals.

13. The method of claim 1 wherein the surfactant is 75% or more in the form of lamellar liquid crystals.

14. The method of claim 1 wherein the surfactant is 90% or more in the form of lamellar liquid crystals.

15. The method of claim 1 wherein the at least one surfactant is non-ionic.

16. The method of claim 1 wherein the at least one surfactant has an hydrophile/lypophile balance (HLB) of from about 1 to about 10.

17. The method of claim 1 wherein the at least one surfactant has an hydrophile/lypophile balance (HLB) of from about 2 to about 7.

18. The method of claim 1 wherein the at least one surfactant has an hydrophile/lypophile balance (HLB) of from about 4 to about 6.

19. The method of claim 1 wherein the at least one surfactant has a melting point of 30° C. or above.

20. The method of claim 1 wherein the at least one surfactant comprises a sorbitan stearate.

21. The method of claim 1 wherein the at least one surfactant comprises a sorbitan monostearate.

22. The method of claim 1 wherein the composition is shear thinning.

23. The method of claim 1 wherein the composition exhibits power law shear thinning behaviour at 25° C. at shear rates of 1 to 1000 $s^{-1}$.

24. The method of claim 1 wherein the composition is shear thinning and wherein the structure of the composition rebuilds rapidly once shear force is removed.

25. The method of claim 1 wherein the composition is shear thinning and wherein the composition regains 90% of its viscosity within 1000 ms of removal of shear force.

26. The method of claim 1 wherein the composition is shear thinning and wherein the composition regains 90% of its viscosity within 500 ms of removal of shear force.

27. The method of claim 1 wherein the composition is shear thinning and wherein the composition regains 90% of its viscosity within 250 ms of removal of shear force.

28. The method of claim 1 wherein the composition has a viscosity of from about 2000 to about 10,000 centipoise (cP).

29. The method of claim 1 wherein the composition has a viscosity of from about 3000 to about 9000 centipoise (cP).

30. The method of claim 1 wherein the composition has a viscosity of from about 4000 to about 8000 centipoise (cP).

31. The method of claim 1, wherein the material is a moldable material and the surface is a mold.

32. The method of claim 31, wherein the composition is used as a release agent to facilitate release.

33. The method of claim 1, wherein the material is asphalt and the surface is an asphalt contacting surface of: a transporting device; a storing device; a handling device; a storing device; or a manipulating device.

* * * * *